No. 830,367. PATENTED SEPT. 4, 1906.
C. J. G. RICKERSON.
AUTOMATIC SWITCH THROWING DEVICE.
APPLICATION FILED MAY 22, 1906.
2 SHEETS—SHEET 1.
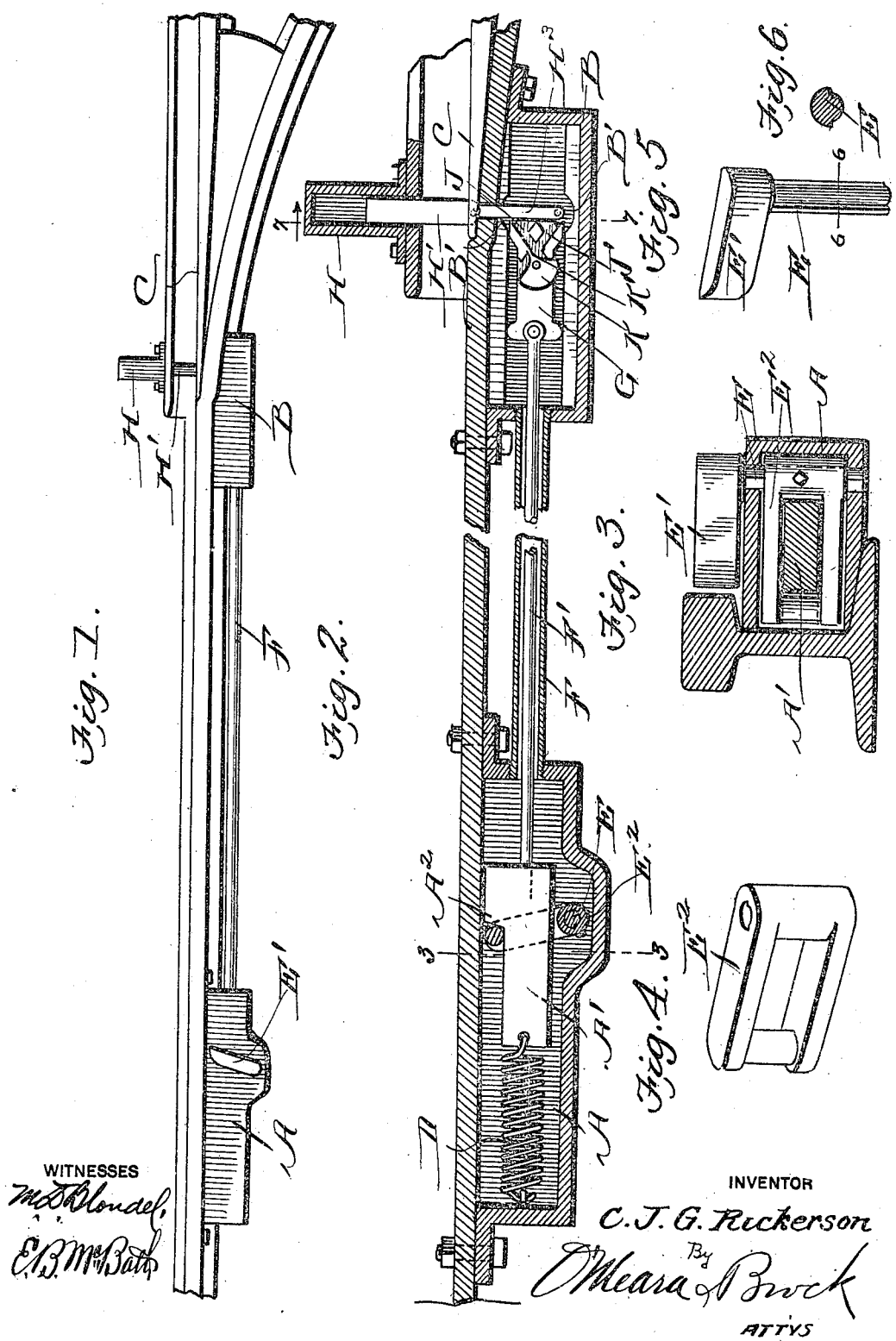
WITNESSES
INVENTOR
C. J. G. Rickerson
By O'Meara & Brock
ATTYS No. 830,367. PATENTED SEPT. 4, 1906.
C. J. G. RICKERSON.
AUTOMATIC SWITCH THROWING DEVICE.
APPLICATION FILED MAY 22, 1906.
2 SHEETS—SHEET 2.
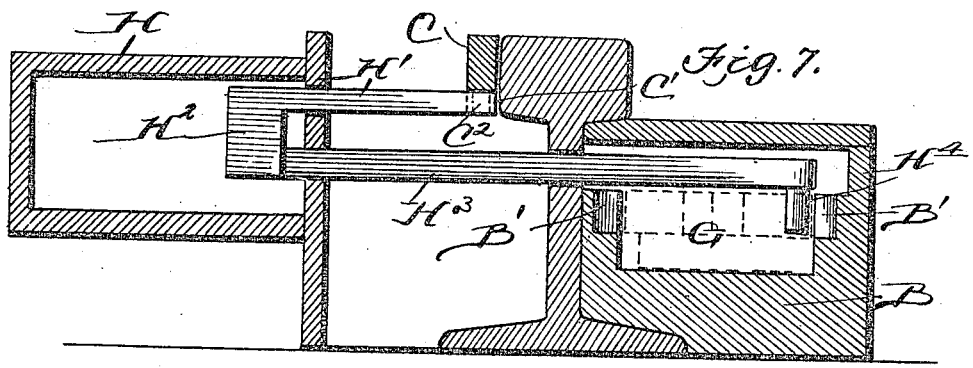
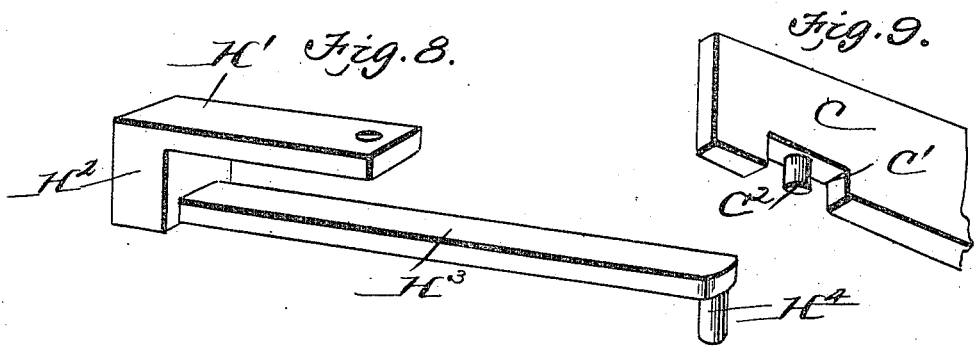
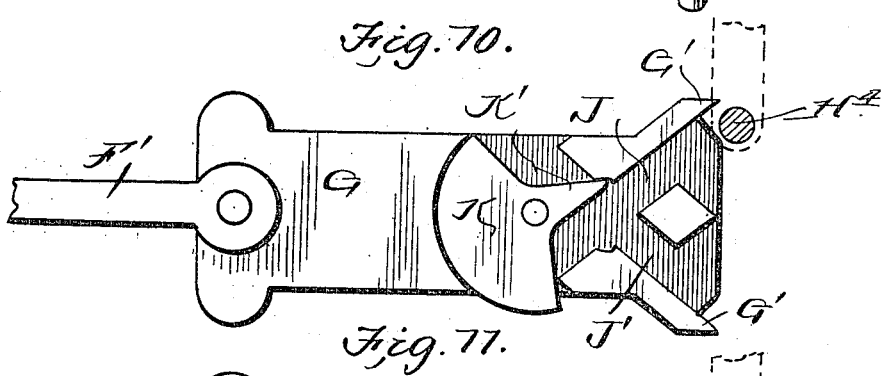
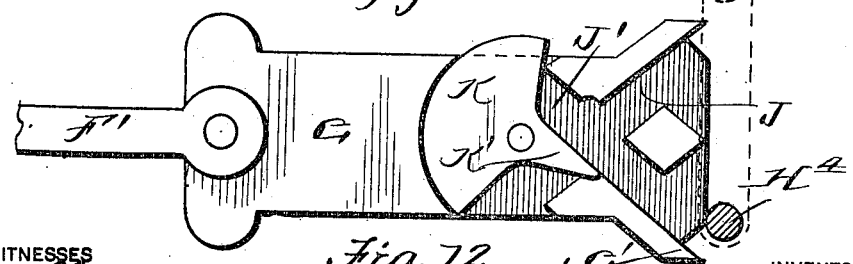
WITNESSES
INVENTOR
C. J. G. Rickerson
ATTYS.

UNITED STATES PATENT OFFICE.

CLINTON J. G. RICKERSON, OF COLORADO SPRINGS, COLORADO.

AUTOMATIC SWITCH-THROWING DEVICE.

No. 830,367.     Specification of Letters Patent.     Patented Sept. 4, 1906.

Application filed May 22, 1906. Serial No. 318,243.

*To all whom it may concern:*

Be it known that I, CLINTON J. G. RICKERSON, a citizen of the United States, residing at Colorado Springs, in the county of El Paso and State of Colorado, have invented a new and useful Improvement in Automatic Switch-Throwing Devices, of which the following is a specification.

This invention is an improvement upon an automatic switch-throwing device for which Letters Patent were granted to me September 19, 1905, No. 799,940.

The object of the invention is to improve the switch-moving device by simplifying its construction and making it more durable and more certain in its operation.

The invention consists in the novel features hereinafter fully described, pointed out in the claims, and shown in the accompanying drawings, in which—

Figure 1 is a plan view of the device. Fig. 2 is a horizontal section through the device, the central portion being broken out. Fig. 3 is a section on the line 3 3 of Fig. 2. Fig. 4 is a detail perspective view of a link seen in side elevation in Fig. 3. Fig. 5 is a detail perspective view of the link-operating means shown in vertical elevation in Fig. 3. Fig. 6 is a cross-section on the line 6 6 of Fig. 5. Fig. 7 is a section on the line 7 7 of Fig. 2. Fig. 8 is a detail perspective view of a switch-throwing bar. Fig. 9 is a detail inverted perspective view of a switch-point. Figs. 10 and 11 are plan views of a block for operating the switch-throwing bar, the movable parts being shown in different positions. Fig. 12 is a side elevation of the block shown in plan in Figs. 10 and 11.

In the drawings, A and B represent casings, the latter being placed adjacent the switch-point and the former placed in advance of it.

Within the casing A is arranged a movable block $A'$, having a shoulder $A^2$. A movable switch-point C is employed, which is cut out, as shown at $C'$, and a pin $C^2$ is arranged in the cut-out portion. A spring D is arranged in the casing A and is connected at one end to the casing and at the opposite end to the block $A'$, and holds the parts in their normal position.

A pin E is rotatably held in the casing A and carries at its upper end a lug $E'$, which is movable upon the top of the casing. Within the casing the rectangular link $E^2$ is carried by the pin E and is suitably keyed or fixed upon the pin, and this link embraces the block $A'$ and bears upon the shoulder $A^2$.

A tube or pipe F connects the casings A and B, and a rod $F'$ works through the tube and is connected at one end to the block $A'$ and at the opposite end is pivoted to the block G.

A guide-cylinder H is arranged adjacent the switch-point, and a bar $H'$ is pivotally connected at one end to the pin $C^2$ and extends into the cylinder or casing H and is provided at its inner end with a depending shoulder $H^2$. A switch-operating bar $H^3$ also works through the end of the casing H and is connected at its inner end to the shoulder $H^2$, and at its outer free end the bar $H^3$ carries a pin $H^4$.

The block G is provided with grooved guideways J and $J'$, which extend diagonally across the block and intersect. At the front end of the block the opposing walls of these guideways project outwardly, forming shoulders $G'$ for the purpose of guiding the pin $H^3$ in its proper direction. A segment K is provided with a point $K'$ and is journaled on the plate so that the point $K'$ is adapted to swing in an arc about the point of intersection of the guideways J and $J'$ and normally forms a wall of one of said guideways and blocks the other guideway by lying transversely across it. The block G slides in a suitable guideway formed in the casing B, which guideway is recessed upon opposite sides, as shown at $B'$.

The operation of the device is as follows: A wedge-shaped shoe carried by and operated from a car can be brought into position by the motorman and upon contacting with the lug $E'$ will swing parallel to the track-rail. This will rotate the pin E and swing the link $E^2$ and force the block $A'$ forwardly. The block G will be moved forwardly, and the pin $H^4$ will be moved along one of the guideways, and upon engaging the segment K will spring the same, throwing the point $K'$ and closing the guideway through which the pin traveled, and the pin will then drop over the side of the block. Assuming that the pin traveled in the guideway J, the bar $H^3$ would be moved in a direction away from the track-rail and would throw the switch-point into the position shown in Figs. 1 and 2, closing the switch. The pin $H^4$ after leaving the guideway J and dropping over the side of the block G would be held in place, and this would hold the switch-point C from rebounding." As soon as the operating means carried by the car had cleared the lug E' the spring D would draw the blocks A' and G back to their original position and the point G' and the block G would swing into one of the recesses B' to permit the block G to pass the pin H⁴. Upon the device being again operated by a succeeding car the forward movement of the block G would lift the pin into the guideway J' and the reverse operation would take place, thus throwing the switch open. In normal position the pin H⁴ rests clear of the block G, so that the switch may be thrown by hand, if desired. Switch-operating means carried by a car are shown and described in the patent above referred to, and any desired form of operating means for moving the lug E may be employed.

Having thus fully described my invention, what I claim as new, and desire to secure by Letters Patent, is—

1. A switch-operating device comprising a bar adapted to operate a switch-point, a pin carried by the bar, a block having intersecting grooves formed thereon, adapted to receive the pin, and means for moving the said block in a direction at a right angle to the bar as and for the purpose set forth.

2. A switch-operating device comprising a bar adapted to operate a switch-point, a block adapted to engage said bar when moved forwardly, a block having a shoulder thereon, a pivoted link embracing said block, and bearing on the shoulder, means for automatically swinging the link forwardly, a rod connecting the two blocks and means for returning both blocks and the link to their original position.

3. A switch-throwing device comprising a block having diagonal-extending grooves upon its face, said groove intersecting, a segment pivoted adjacent said grooves and having a point adapted to describe an arc about the point of intersection of the grooves, a bar adapted to move a switch-point, a pin carried by said bar adapted to alternately travel in the said segment and means for moving the said block as and for the purpose set forth.

4. The combination with a movable switch-point, operating means connected to said point, said means carrying a downwardly-extending pin, a horizontally-movable block having guideways J and J', formed thereon, a segment having a point, said segment being pivoted upon the block, and the point being movable about the point of intersection of the guideways and means for moving the block forwardly, the pin traveling alternately in the guideways J and J', upon forward movement of the block and resting upon one side of the block upon rearward movement of the block.

CLINTON J. G. RICKERSON.

Witnesses:
MARTIN T. YATES,
D. OTTO McCLAIN.